United States Patent [19]

Harris

[11] Patent Number: 4,621,588
[45] Date of Patent: Nov. 11, 1986

[54] SHELLFISH CULTIVATOR

[76] Inventor: Sherwood Harris, The Glen, R.R. #3, Katonah, N.Y. 10536

[21] Appl. No.: 811,427

[22] Filed: Dec. 20, 1985

[51] Int. Cl.⁴ .............................................. A01K 61/00
[52] U.S. Cl. ....................................................... 119/4
[58] Field of Search ............................................ 119/4

[56] References Cited

U.S. PATENT DOCUMENTS

| 3,650,244 | 3/1972 | Fordham | 119/4 |
| 3,996,895 | 12/1976 | Wiegardt, Jr. | 119/4 |
| 4,061,110 | 12/1977 | Steidle | 119/4 |

Primary Examiner—Hugh R. Chamblee

[57] ABSTRACT

A shellfish cultivator in which shellfish such as bivalve mollusks, e.g, oysters, can grow to maturity, e.g., in a pond or closed water system or in open waters, includes a screened-in housing which provides a plurality of horizontal slideways, these slideways including at least one upper slideway and a lowermost slideway, and a plurality of drawers which are slidable along the slideways, the drawers slidable in the upper slideways being drop drawers and the drawer slidable in the lowermost slideway being a bottom receiving drawer. Each drop drawer includes a floor that includes rotatable, perforated louvers and a control rod which is rotatable from outside the housing and which can control the orientation of the louvers so as to determine whether the floor is open or closed. When the floor of each drop drawer is opened the shellfish thereon will fall onto the floor of the drawer therebelow and when closed will retain the shellfish therein for growth. Only the uppermost drop drawer and the bottom receiving drawer need to be withdrawn from the housing when immature shellfish are added to the housing and mature shellfish are removed during servicing.

20 Claims, 7 Drawing Figures

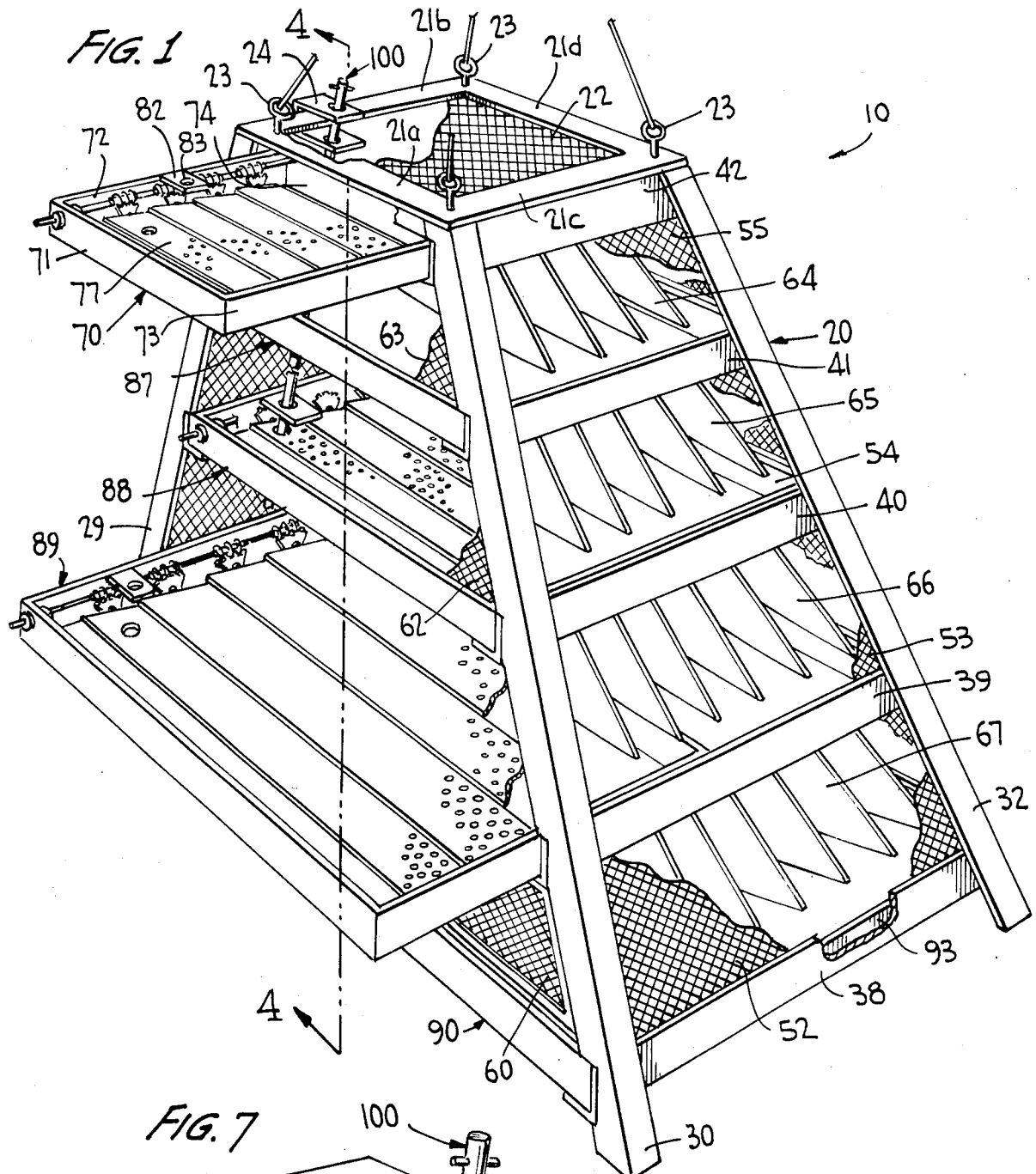
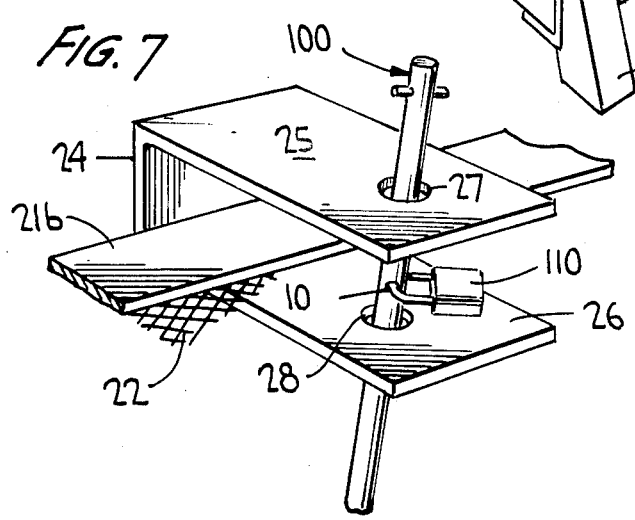

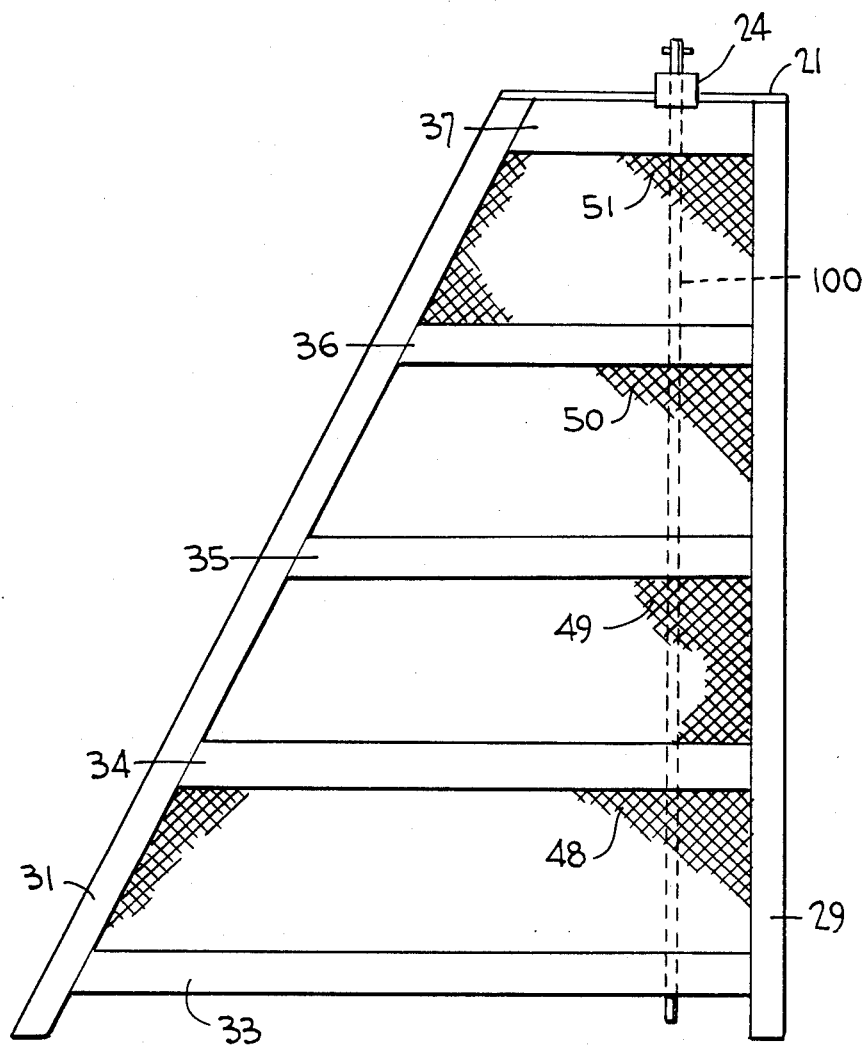

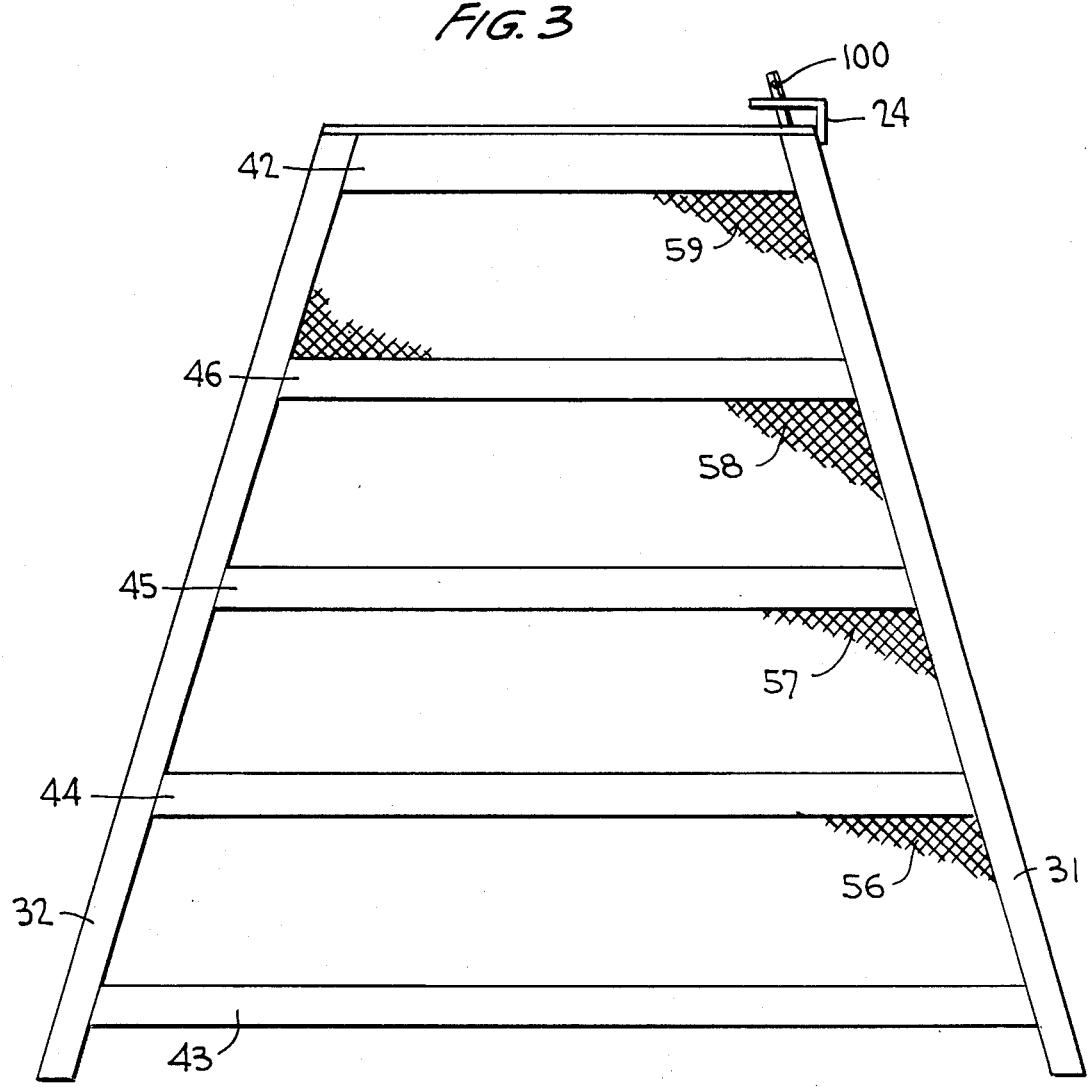

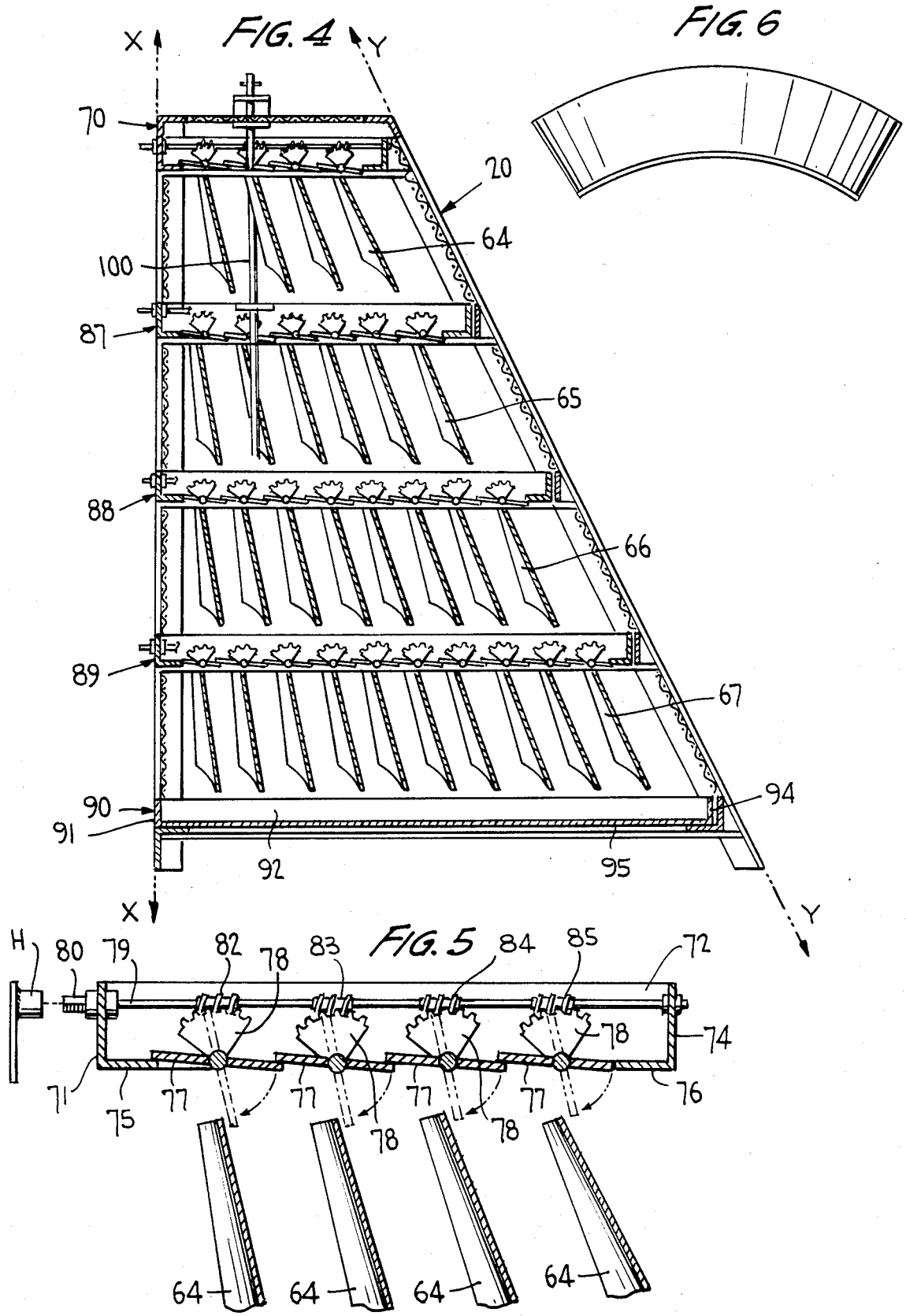

SHELLFISH CULTIVATOR

BACKGROUND OF THE INVENTION

1. Field of the Invention

The present invention relates to cultivating devices which can be used to grow and harvest shellfish such as bivalve mollusks, and especially oysters.

2. The Prior Art

Cultivating devices for providing protective environments in which shellfish such as bivalve mollusks (e.g., oysters) can grow to maturity are well known. Some of the known cultivating devices include separate trays or drawers which are positionable on top of one another in support housings which can be lowered into bodies of water. Such cultivating devices are disclosed, for example, in U.S. Pat. Nos. 3,702,599, 3,741,159 and 4,061,110. However, these prior art cultivating devices are very laborsome and time consuming to service because it is not possible to transfer the shellfish from one tray thereof to another tray without removing each of the trays from the support housing. In addition, these prior art cultivating devices are not capable of cultivating commercial quantities of shellfish (e.g. oysters) because they are not constructed to take into consideration the expansion (scale up) of the growing area which is needed for the shellfish to grow to a fully mature size. Instead, they enable shellfish to grow to only limited sizes (for oysters, about ¾ inch in length), after which the shellfish must be transported to open water bottoms for final growth. During this final growth procedure fishermen (oystermen) must manually shift the shellfish (oysters) around with dredges and rakes so as to give them sufficient room to grow to maturity. This is of course very labor intensive and tends to defeat one of the main objectives of artificial shellfish propagation, which is of course to make the whole process more efficient and productive.

SUMMARY OF THE INVENTION

It is an object of the present invention to provide a shellfish cultivator in which commercially viable quantities of mature shellfish, and in particular oysters, can be produced in ponds or closed indoor systems or in open waters.

It is a further object of the present invention to provide a shellfish cultivator which, when used to cultivate oysters, can grow the oysters from seed oysters having a length of about ¼ inch to mature oysters having a length of about 4 inches, a 16-fold increase in size.

It is a still further object of the present invention to provide a shellfish cultivator which includes a housing and drawers which are removably mounted in the housing, yet wherein, when fully operational, only the uppermost and bottommost drawers need to be withdrawn from the housing in order to respectively add new immature shellfish to the cultivator and remove the fully matured and harvestable shellfish from the cultivator, the shellfish on any other drawers therein being movable to the next lower drawer without the need to withdraw the drawers from the housing.

It is a still further object of the present invention to provide such a shellfish cultivator wherein the drawers thereof are of increasing length and width dimensions from the uppermost drawer to the bottommost drawer, thus providing larger areas in which the shellfish can grow.

More specifically, according to the present invention the shellfish cultivator includes a screened-in housing which provides at least one upper slideway and a lowermost slideway, a drop drawer which is slidably positionable in each upper slideway and a bottom receiving drawer which is slidably positionable in the lowermost slideway. Each of the drop drawers includes a floor constructed in part of perforated louvers which can be rotated to be "closed", i.e., so as to retain shellfish thereon, or "opened", i.e., to allow the shellfish to drop therepast onto the floor of the drawer therebelow, and each drop drawer includes a rotatable control rod to control the rotation of the louvers. Each control rod can be rotated from outside the housing, i.e., without the need to withdraw the drop drawer from the housing. When the shellfish cultivator includes multiple upper slideways with associated drop drawers, the uppermost drop drawer is the smallest in length and width dimensions, and each lower drop drawer is progressively larger in length and width dimensions. The bottom receiving drawer has the largest length and width dimensions. Suitably large and mature shellfish are harvested from the bottom receiving drawer, whose floor is continuous and flat. The drop drawers and the bottom receiving drawer include means which enables a locking bar to be extended therethrough to lock the drawers within the housing.

A further understanding of the invention will be achieved by reference to the accompanying drawings taken in conjunction with the following discussion.

DESCRIPTION OF THE DRAWINGS

In the drawings,

FIG. 1 shows a perspective view of a shellfish cultivator constructed in accordance with the present invention, certain portions of the housing thereof being broken away to better show its interior and two of the drop drawers thereof being shown in partially withdrawn positions with respect to the housing, the other two drop drawers thereof and the bottom receiving drawer thereof being shown in their fully inserted positions, FIG. 2 shows an elevational left side view of the shellfish cultivator of FIG. 1 when all of the drop drawers and the bottom receiving drawer are in their fully inserted positions within the housing, FIG. 3 shows a rear elevational view of the shellfish cultivator of FIG. 1, FIG. 4 shows a sectional view along line 4—4 of FIG. 1 when all of the drop drawers and the bottom receiving drawer are in their fully inserted positions within the housing and a locking bar has been inserted downwardly into the housing to lock all of the drawers in position, FIG. 5 shows, on an enlarged scale, a detail of the shellfish cultivator, in particular a cross sectional view through the uppermost drop drawer and the upper ends of the distribution chutes therebelow, FIG. 6 shows a top plan view of one of the distribution chutes, and FIG. 7 shows another detail of the shellfish cultivator, in particular a perspective view of the generally U-shaped bracket attached to the top frame member of the housing and the upper end of the locking bar passing therethrough (with associated padlock).

DETAILED DESCRIPTION OF THE PREFERRED EMBODIMENT

A preferred shellfish cultivator constructed in accordance with the present invention is shown in FIGS. 1-7 and is generally identified by reference numeral 10. It includes a housing 20, four drop drawers 70, 87, 88 and 89, a bottom receiving drawer 90, a removable locking bar 100, and a padlock 110. In the following discussion the terms top, bottom, upwardly, downwardly, front, rear, left, right, vertical and horizontal will be used on the assumption that the shellfish cultivator is operatively positioned on a horizontally-extending floor of a body of water and is being viewed from the side from which the drop drawers 70, 87, 88 and 89 and the bottom receiving drawer 90 can be inserted and withdrawn from the housing 20.

The housing 20 includes a horizontal top frame member 21 which includes a front portion 21a, a left side portion 21b, a right side portion 21c and a rear portion 21d, these portions providing the top frame member with a generally rectangular configuration and a generally rectangular opening therein. A screen 22 extends from the front portion 21a to the rear portion 21d and from the left side portion 21b to the right side portion 21c to cover the generally rectangular opening. Extending upwardly from each of the four corners of the top frame member are eye mounts 23, these eye mounts enabling lines or cables to be attached to the shellfish cultivator so that it can be connected, for example, to a buoy floating thereabove and, when necessary for servicing, raised and lowered with respect to a boat thereabove.

As best seen in FIGS. 1 and 7, a generally U-shaped bracket 24 is fixedly attached to the left side portion 21b so that its upper and lower legs 25 and 26 extend toward the right side portion 21c and, its upper leg 25 being positioned above the screen 22 and its lower leg 26 being positioned below the screen 22. The upper and lower legs 25 and 26 include aligned holes 27 and 28 through which a locking bar 100 can be extended downwardly into the housing (the screen 22 also includes a hole therein (not shown) which is aligned with the holes 27 and 28).

Extending downwardly from the respective left and right front corners of the top frame member 21 are left front and right front leg members 29 and 30, and extending downwardly from the respective left and right rear corners of the top frame member 21 are left rear and right rear leg members 31 and 32. The left front and right front leg members 29 and 30 diverge from one another as they extend downwardly from the top frame member 21, while at the same time remaining aligned in a vertical plane X—X. The left rear and right rear leg members 31 and 32 also diverge from one another as they extend downwardly from the top frame member 21 (to the same degree that the left front and right front leg members diverge from one another) while at the same time being aligned in a common plane Y—Y which diverges from the vertical plane X—X at an angle of about 20°. Each of the leg members 29-32 has a generally L-shaped cross section which opens toward the interior of the housing 20.

The left front and left rear leg members 29 and 31 are connected by five horizontally-oriented, vertically spaced apart left side brace members 33-37; the right front and right rear leg members 30 and 32 are connected by five horizontally-oriented, vertically spaced apart right side brace members 38-42; and the left rear and right rear leg members 31 and 32 are connected by five horizontally-oriented, vertically spaced apart rear brace members 43-47. These left side, right side and rear brace members have generally L-shaped cross sections and their lower flanges extending horizontally inwardly of the housing so as to provide five horizontal slideways. More specifically, left side, right side and rear brace members 37, 42 and 47 provide a first uppermost slideway for the (uppermost) drop drawer 70; left side, right side and rear brace members 36, 41 and 46 provide a second uppermost slideway for the drop drawer 87; left side, right side and rear brace members 35, 40 and 45 provide a third uppermost slideway for the drop drawer 88; left side, right side and rear brace members 34, 39 and 44 provide a fourth uppermost slideway for the drop drawer 89; and left side, right side and rear brace members 33, 38 and 43 provide a lowermost slideway for the bottom receiving drawer 90.

As can be seen in FIGS. 1-3, screen sections 48-51 respectively extend between the left front and left rear leg members 29 and 31 and between the left side brace members 33-37 to cover the left side of the housing 20 above the lowermost slideway. Likewise, screen sections 52-55 respectively extend between the right front and right rear leg members 30 and 32 and between the right side brace members 38-42 to cover the right side of the housing 20 above the lowermost slideway, and screen sections 56-59 respectively extend between the left rear and right rear leg members 31 and 32 and between the rear brace members 43-47 to cover the rear side of the housing 20 above the lowermost slideway. At the front side of the housing screen sections 60-63 extend between the left front and right front brace members 29 and 30 and between the lowermost and first uppermost slideways. More particularly, screen section 60 extends from a location just above the lowermost slideway to just below the fourth uppermost slideway (leaving room for the bottom receiving drawer 90), screen section 61 extends from a location just above the fourth uppermost slideway to just below the third uppermost slideway (the screen sections 60 and 61 leave just enough room for the drop drawer 89 to fit therebetween), screen section 62 extends from a location just above the third uppermost slideway to just below the second uppermost slideway (the screen sections 61 and 62 leave just enough room for the drop drawer 88 to fit therebetween), and screen section 63 extending from a location just above the second uppermost slideway to just below the first uppermost slideway (the screen sections 62 and 63 leave just enough room for drop drawer 87 to fit therebetween). Because the first uppermost slideway is located immediately below the top frame member 21, no screen sections are needed thereabove. The screen sections 48-62 function to screen in the interior of the housing when the drop drawers 70 and 87-89 and the bottom drawer 90 are inserted into the housing 20.

Extending between the corresponding left side and right side brace members 37 and 42 are four spaced apart distribution chutes 64 which extend downwardly and rearwardly of the housing 20; extending between the corresponding left side and right side brace members 36 and 41 are six spaced apart distribution chutes 65 which also extend downwardly and rearwardly of the housing 20; extending between the corresponding left side and right side brace members 35 and 40 are eight spaced apart distribution chutes 66 which also extend downwardly and rearwardly of the housing 20; and extending between the corresponding left side and right side brace members 34 and 41 are ten spaced apart distribution chutes 67 which also extend downwardly and rearwardly of the housing. As indicated in FIGS. 4 and 6, each of the distribution chutes is bowed towards the rear side of the housing. The function of the distribution chutes will be referred to below.

Turning now to the drop drawers 70, 87, 88 and 89, which are respectively slidable along the first uppermost, the second uppermost, the third uppermost and the fourth uppermost slideways, they are similarly constructed. As such, only the construction of the drop drawer 70 will be discussed in detail, it being understood that drop drawers 87, 88 and 89 are similarly constructed (the exceptions being noted below).

The drop drawer 70 includes a front wall 71, a left side wall 72, a right side wall 73, a rear wall 74, a front floor portion 75, a rear floor portion 76, and four perforated louvers 77 which extend between and are rotatably mounted on the left side and right side walls 72 and 73. The perforations in the louvers 77 are sized to allow water and nutrients to freely flow therethrough, yet prevent baby shellfish such as seed oysters having a length of about ¼ inch from passing therethrough. The louvers are spaced apart such that, when generally horizontally oriented, they contact each other and the front and rear floor portions 75 and 76 to provide a "closed" floor. When generally vertically oriented so as to provide an "open" floor, they will contact the upper ends of the respective distribution chutes 62 therebelow (see phantom orientations shown in FIG. 5), i.e., when the drop drawer 70 is fully inserted in the housing 20. Each louver includes a fan-shaped gear sector 78 which extends upwardly from its upper surface near the left side wall 72. The drop drawer 70 also includes a rotatable control rod 79 which extends from the rear wall 74 through bushing 80 in the front wall 71. The front end of the control rod 79 extends beyond the front wall 71 and has a configuration which allows it to be gripped and rotated by a handle H which can be inserted thereover. The control rod 79 includes helical thread sections 81-84 along its length, these helical thread sections respectively engaging the upwardly extending fan-shaped gear sectors 78 of the four louvers 77. As such, rotation of the control rod 79 by the removable handle H will cause the louvers 77 to rotate and thus cause the floor to become "opened" or "closed." Extending inwardly from the left side wall 73 toward the right side wall 74 is a flange 85 which includes a hole 86 therein, the hole 86 being aligned with the holes 27 and 28 in the generally U-shaped bracket 24. The louver immediately below the flange 85 also includes a hole which is also aligned with the holes 27, 28 and 86 when the louver is generally horizontally oriented.

The drop drawers 87, 88 and 89 are similarly constructed to the drop drawer 70, although they are sequentially larger in length and width dimensions so as to fit within their associated slideways. In the most preferred embodiment, the drop drawer 70 will have length and width dimensions of 2 feet by 2 feet (total area of 4 square feet), the drop drawer 87 will have dimensions of 2 feet 10 inches by 2 feet 10 inches (total area of 8 square feet), the drop drawer 88 will have dimensions of 4 feet by 4 feet (total area of 16 square feet) and the rop drawer 89 will have dimensions of 5 feet 8 inches by 5 feet 8 inches (total area of 32 square feet). In addition, they have increasing numbers of louvers, i.e., drop drawer 87 has six louvers, drop drawer 88 has eight louvers and drop drawer 89 has ten louvers. At the same time, the perforations in the louvers of the respective drop drawers have increasingly large diameters, e.g., to allow passage of greater volumes of water and nutrients therethrough while preventing the increasingly large shellfish, e.g., oysters with lengths of about ½ inch, 1 inch and 2 inches, respectively, from passing therethrough. The holes in the flanges which extend inwardly from the left side walls thereof are nevertheless all aligned with the holes 27 and 28 in the generally U-shaped bracket 24, as are the holes in the associated louvers therebelow.

The bottom receiving drawer 90 has greater length and width dimensions than the drop drawer 89 thereabove, i.e., and is slidable along the lowermost slideway (in the most preferred embodiment it has dimensions of 8 feet by 8 feet (total area of 64 square feet)). As seen in FIG. 4, it includes a front wall 91, a left side wall 92, a right side wall 93 (see FIG. 1), and a rear wall 94, as well as a continuous, flat floor 95. It also includes a flange (not shown) which extends from the left side wall toward the right side wall which has a hole that is aligned with the holes 27 and 28 in the generally U-shaped bracket 24 and the holes in the flanges of each drop drawer thereabove. When all the drawers 70, 87, 88, 89 and 90 are fully inserted in the housing 20 and the locking bar 100 is extended downwardly through the holes 27 and 28 on the generally U-shaped bracket 26 and sequentially through the hole 83 in the flange 82 of the drop drawer 70 and the corresponding holes in the flanges and associated louvers of drop drawers 87, 88, 89 and bottom receiving drawer 90, the lower end of locking bar 100 will lock all of the drawers in, with all their louvers in their hoizontal positions, position within the housing 20. The locking bar 100 can itself be locked in position by extending the arm of a padlock 110 through a bore 101 in the upper end of the locking bar 100 when the bore is located between the legs 25,26 of the generally U-shaped bracket 24 and then closing the padlock 110.

The inventive shellfish cultivator can be used to cultivate shellfish, e.g., oysters, as follows. With the locking bar 100 removed from the housing 20, the drop drawer 70 is at least partially removed from the housing 20 and seed oysters having a length of about ¼ inch are placed in a layer on the floor thereof, the louvers 77 being generally horizontally oriented to "close" the floor of the drop drawer. The uppermost drop drawer 70 is then fully inserted into the housing, the locking bar 100 is inserted into the housing and locked in position by the padlock 110, and the housing is then lowered into the water and down to its floor. After a predetermined period of time has passed, during which the shellfish will have grown to an appropriately larger size, e.g., about ½ inch in length, the shellfish cultivator is hoisted upwardly to a position above the surface of the water, after which the operator will unlock the padlock 110 and withdraw the locking rod 100 from the housing 20, then insert a handle H into the front end of the control rod 79 of the drop drawer 70 and rotate it, such that the control rod will rotate, causing louvers 77 to rotate, thereby causing the oysters thereon to fall by gravity downwardly over the distribution chutes 64 and onto the floor of the drop drawer 87 therebelow whose louvers are generally horizontally oriented to "close" the floor. Thereafter, the drop drawer 70 is at least partially withdrawn from housing 20 and filled with a new layer of seed oysters, then reinserted and locked in position as noted above and the shellfish cultivator lowered again to the floor of the water. This process is repeated until each of the drop drawers 88 and 89 and the bottom drawer 90 are respectively filled with increasingly large and mature oysters, e.g., about 1, 2 and 4 inches in length. The oysters in the floor of the bottom receiving drawer 90 will have the desired size and maturity for harvesting.

The various parts of the inventive shellfish cultivator can be made from materials which are suitably corrosion-resistant and which inhibit marine growth thereon. Suitable materials includes plastics, such as molded polyethylene or polypropylene, corrosion-resistant metallic materials or plastic-coated metallic materials.

Although a preferred embodiment of the inventive shellfish cultivator has been shown and described in detail, it is obvious that various modifications therein could be made and still fall within the scope of the appended claims. For example, the housing could include more or less left side and right side brace members and corresponding more or fewer slideways and associated drop drawers as desired. Alternatively, the housing could be made with only one rear brace member, provided that a screen section covering the rear of the housing will extend from the lowermost slideway up to the top frame member. In addition, the lower ends of the leg members 29-32 could include weights attached thereto to provide greater stability to the housing, i.e., enhance its resistance to being toppled over by strong currents or impacts. The screens covering the left, right and rear sides of the housing can be separated sections or portions of single sheets, located either inside or outside the housing.

I claim:

1. A shellfish cultivator which comprises
a housing which has a front side, a left side, a right side and a rear side and which includes a top frame member, a plurality of leg members which extend downwardly from said top frame member; a plurality of horizontal brace members which extend between said leg members and which provide a plurality of horizontal slideways which extend from the front side to the rear side of said housing, said plurality of horizontal slideways including at least one upper slideway and a lowermost slideway; and a plurality of screen sections which extend between said leg members and which cover the front side, the left side, the right side and rear side of said housing between said slideways,
a respective drop drawer slidably positioned in each upper slideway, each drop drawer including a front wall, a left side wall, a right side wall, a rear wall and a floor which includes a plurality of perforated louvers which are rotatable to open or close the floor, and
a bottom receiving drawer slidably positioned in said lowermost slideway, said bottom receiving drawer including a front wall, a left side wall, a right side wall, a rear wall and a continuous, flat floor, each said drop drawer and said bottom receiving drawer being insertable between adjacent screen sections extending between leg members on the front side of said housing.

2. The shellfish cultivator as defined in claim 1, wherein said housing includes a left front leg member, a right front leg member, a left rear leg member and a right rear leg member; wherein said leg members diverge from one another as they extend downwardly from said top frame member; wherein said housing includes at least two left side brace members which extend between said left front and left rear leg members and at least two right side brace members which extend between said right front and right rear leg members, said left side and right side brace members forming each upper slideway and said lowermost slideway; and wherein each drop drawer and said bottom receiving drawer have length and width dimensions, said bottom receiving drawer having the largest length and width dimensions and each drop drawer thereabove having progressively smaller length and width dimensions.

3. The shellfish cultivator as defined in claim 2, wherein said left front and right front leg members diverge from one another as they extend downwardly from said top frame member in a first common plane; wherein said left rear and right rear leg members diverge from one another as they extend downwardly from the top frame member in a second common plane, wherein said second common plane diverges from said first common plane; and wherein said left rear and right rear leg members diverge from one another to the same degree that said left front and right front leg members diverge from one another.

4. The shellfish cultivator as defined in claim 3, wherein said housing includes a plurality of distribution chutes which are connected between corresponding left side and right side brace members, each distribution chute being bowed towards the rear side of said housing.

5. The shellfish cultivator as defined in claim 4, wherein each of said left side and right side brace members are generally L-shaped and have a lower flange which is horizontally oriented towards the interior of said housing.

6. The shellfish cultivator as defined in claim 5, wherein each louver of each drop drawer includes an upwardly-extending fan-shaped gear sector, and wherein each drop drawer includes a rotatable control rod which extends from the rear wall thereof to the front wall thereof, each rotatable control rod including helical thread sections which engage with the upwardly-extending fan-shaped gear sectors of the louvers thereof.

7. The shellfish cultivator as defined in claim 6, wherein the front wall of each drop drawer includes a bushing therein, and wherein the control rod of the associated drop drawer extends through said bushing and has a contoured front end which extends forwardly of said bushing, said contoured front end being engageable by a removable handle to rotate said control rod and thereby rotate the associated louvers.

8. The shellfish cultivator as defined in claim 7, wherein said top frame member includes a hole therethrough, wherein each of said drop drawers and said bottom receiving drawer include a flange means which extends inwardly thereof, each flange means including a hole therein which is aligned with the hole in said top frame member, and wherein said shellfish cultivator includes a locking bar which is extendable through the hole in said top frame member and the holes in the flanges of said drop drawers and said bottom receiving drawer to lock all of said drawers in position within said housing.

9. The shellfish cultivator as defined in claim 8, wherein the flanges of each of said drop drawers extend above a louver of the associated drawer, and wherein each louver located below a flange includes a hole which, when the louver is generally horizontally oriented, is aligned with the hole in the flange thereabove.

10. The shellfish cultivator as defined in claim 9, wherein said top frame member includes a front portion, a left side portion, a right side portion and a rear portion; wherein said portions provide a generally rectangular opening in said top frame member; wherein a screen section extends over said generally rectangular opening; and wherein a generally U-shaped bracket is attached to one of said left side and right side portions and extends towards the other of said left side and right side portions, said generally U-shaped bracket has two horizontally-oriented legs, each said leg having a hole therein, the holes in said legs being aligned, and wherein said screen which extends over said generally rectangular opening includes a hole which is aligned with said holes in said legs.

11. The shellfish cultivator as defined in claim 10, wherein said locking bar includes an upper portion having a bore therethrough, and a lower portion, said bore in said upper portion being locatable between the legs of said generally U-shaped bracket when said lower portion thereof extends through the holes in the flanges and louvers of each of said drop drawers and said bottom receiving drawer, and including a padlock which is extendable through said bore to fixedly position said locking bar in position.

12. The shellfish cultivator as defined in claim 11, wherein said housing includes at least one rear brace member which extends between said left rear leg member and said right rear leg member.

13. The shellfish cultivator as defined in claim 12, wherein said housing includes five left side brace members and five right side brace members, thus providing four upper slideways and said lowermost slideway, said four upper slideways including a first uppermost slideway, a second uppermost slideway, a third upper slideway, and a fourth uppermost slideway, and wherein said shellfish cultivator includes four drop drawers which are respectively slidable along said first, second, third, and fourth uppermost slideways.

14. The shellfish cultivator as defined in claim 13, wherein the drop drawer which is slidable in said first uppermost slideway includes four perforated louvers, wherein the drop drawer which is slidable in said second uppermost slideway includes six perforated louvers, wherein the drop drawer which is slidable in said third uppermost slideway includes eight perforated louvers, and wherein the drop drawer which is slidable in said fourth uppermost slideway includes ten perforated louvers.

15. The shellfish cultivator as defined in claim 14, wherein the perforations in the louvers of said drop drawers in said first, second, third and fourth uppermost slideways have increasing diameters.

16. The shellfish cultivator as defined in claim 15, wherein said housing includes four downwardly-extending distribution chutes connected between the corresponding left side and right side brace members providing said first uppermost slideway, six downwardly-extending distribution chutes connected between the corresponding left side and right side brace members providing said second uppermost slideway, eight downwardly-extending distribution chutes connected between the corresponding left side and right side brace members providing said third uppermost slideway, and ten downwardly-extending distribution chutes connected between the corresponding left side and right side brace members providing said fourth uppermost slideway.

17. The shellfish cultivator as defined in claim 16, wherein the drop drawer in said first uppermost slideway has length and width dimensions of about 2 feet by 2 feet, wherein the drop drawer in said second uppermost slideway has length and width dimensions of about 2 feet 10 inches by 2 feet 10 inches, wherein the drop drawer in said third uppermost slideway has length and width dimensions of about 4 feet by 4 feet, wherein the drop drawer in said fourth uppermost slideway has length and width dimensions of about 5 feet 8 inches by 5 feet 8 inches, and wherein said bottom receiving drawer has length and width dimensions of about 8 feet by 8 feet.

18. A drop drawer for use in a shellfish cultivator which includes a front wall, a left side wall, a right side wall, a rear wall, and a floor which includes a plurality of perforated louvers which are rotatable to open or close the floor.

19. A drop drawer as defined in claim 18, wherein each louver includes an upwardly-extending fan-shaped gear sector, and wherein said drop drawer further includes a rotatable control rod which extends from the rear wall thereof to the front wall thereof, said rotatable control rod including helical thread sections which engage with the upwardly-extending fan-shaped gear sectors of said louvers.

20. A drop drawer as defined in claim 19, wherein said front wall includes a bushing therein, and wherein said control rod extends through said bushing and has a contoured front end which extends forwardly of said bushing, said contoured front end being engageable by a removable handle to rotate said control rod and thereby rotate said louvers.

* * * * *